(12) United States Patent
Pilatowicz

(10) Patent No.: US 12,490,775 B2
(45) Date of Patent: Dec. 9, 2025

(54) AEROSOL GENERATION DEVICE POWER SYSTEM

(71) Applicant: JT International SA, Geneva (CH)

(72) Inventor: Grzegorz Aleksander Pilatowicz, Grens (CH)

(73) Assignee: JT International SA (CH)

(*) Notice: Subject to any disclaimer, the term of this patent is extended or adjusted under 35 U.S.C. 154(b) by 428 days.

(21) Appl. No.: 18/033,486

(22) PCT Filed: Oct. 25, 2021

(86) PCT No.: PCT/EP2021/079572
§ 371 (c)(1),
(2) Date: Apr. 24, 2023

(87) PCT Pub. No.: WO2022/090172
PCT Pub. Date: May 5, 2022

(65) Prior Publication Data
US 2023/0397671 A1    Dec. 14, 2023

(30) Foreign Application Priority Data
Oct. 26, 2020  (EP) .................................... 20203967

(51) Int. Cl.
*A24F 47/00*    (2020.01)
*A24F 40/50*    (2020.01)
(Continued)

(52) U.S. Cl.
CPC .............. *A24F 40/95* (2020.01); *A24F 40/50* (2020.01); *H01M 10/44* (2013.01);
(Continued)

(58) Field of Classification Search
CPC ............ A24F 40/50; A24F 40/90; A24F 40/95
See application file for complete search history.

(56) References Cited

U.S. PATENT DOCUMENTS 5,808,447 A    9/1998  Hagino
2016/0360787 A1    12/2016  Bailey
(Continued)

FOREIGN PATENT DOCUMENTS

CA    2380945 A1    10/2003
CN    204763429 U    11/2015
(Continued)

OTHER PUBLICATIONS

International Search Report for PCT/EP2021/079572 mailed Feb. 23, 2022. 5 pgs.
(Continued)

*Primary Examiner* — Eric Yaary
(74) *Attorney, Agent, or Firm* — Lerner David LLP

(57) ABSTRACT

An aerosol generation device includes a power system and a controller. The power system includes a supercapacitor module and a battery module, and is connectable to an external power source. The controller is configured control a pulse-charging regime of the power system by controlling a first power flow from the external power source to the power system to cyclically switch the first power flow between charging the battery module in a first time period and not charging the battery module in a second time period in a pulse-charging manner, and controlling a second power flow between the supercapacitor module and battery module to charge the battery module from the supercapacitor module in the first time period.

14 Claims, 6 Drawing Sheets

(51) Int. Cl.
*A24F 40/95* (2020.01)
*H01M 10/44* (2006.01)
*H02J 7/00* (2006.01)
*H02J 7/34* (2006.01)

(52) U.S. Cl.
CPC .......... *H02J 7/00711* (2020.01); *H02J 7/342* (2020.01); *H02J 7/345* (2013.01); *H02J 2207/20* (2020.01); *H02J 2207/50* (2020.01); *H02J 2310/22* (2020.01)

(56) References Cited

U.S. PATENT DOCUMENTS

| | | | |
|---|---|---|---|
| 2017/0258135 | A1 | 9/2017 | Yerkic-Husejnovic et al. |
| 2017/0294804 | A1 | 10/2017 | Sur |
| 2017/0347714 | A1 | 12/2017 | Metz et al. |
| 2018/0140011 | A1 | 5/2018 | Sur et al. |
| 2020/0128884 | A1 | 4/2020 | Yamada et al. |
| 2020/0154779 | A1 | 5/2020 | Novak, III et al. |

FOREIGN PATENT DOCUMENTS

| | | |
|---|---|---|
| EP | 2100525 A1 | 9/2009 |
| EP | 3007305 A1 | 4/2016 |
| EP | 3607985 A1 | 2/2020 |
| WO | 2017/070039 A1 | 4/2017 |

OTHER PUBLICATIONS

International Search Report for PCT/EP2021/079570 mailed Feb. 8, 2022. 5 pgs.
International Search Report for PCT/EP2021/079571 mailed Feb. 7, 2022. 3 pgs.
Füglistaller, J., "Aerosol Generation Device Power System", Co-pending U.S. Appl. No. 18/033,653, filed Apr. 25, 2023.
Füglistaller, J., "Aerosol Generation Device Power System", Co-pending U.S. Appl. No. 18/033,678, filed Apr. 25, 2023.

AEROSOL GENERATION DEVICE POWER SYSTEM

CROSS-REFERENCE TO RELATED APPLICATIONS

The present application is a national phase entry under 35 U.S.C. § 371 of International Application No. PCT/EP2021/079572, filed Oct. 25, 2021, published in English, which claims priority to European Application No. 20 203 967.3 filed Oct. 26, 2020, the disclosures of which are incorporated herein by reference.

FIELD OF INVENTION

The present invention relates to aerosol generation devices, and more specifically aerosol generation device power systems.

BACKGROUND

Aerosol generation devices such as electronic cigarettes and other aerosol inhalers or vaporisation devices are becoming increasingly popular consumer products.

Heating devices for vaporisation or aerosolisation are known in the art. Such devices typically include a heating chamber and heater. In operation, an operator inserts the product to be aerosolised or vaporised into the heating chamber. The product is then heated with an electronic heater to vaporise the constituents of the product for the operator to inhale. In some examples, the product is a tobacco product similar to a traditional cigarette. Such devices are sometimes referred to as "heat not burn" devices in that the product is heated to the point of aerosolisation, without being combusted.

Problems faced by known aerosol generation devices include improving power management.

SUMMARY OF INVENTION

In a first aspect, there is provided an aerosol generation device, the aerosol generation device comprising:
- a power system comprising a supercapacitor module and a battery module, the power system connectable to an external power source; and
- a controller, wherein the controller is configured control a pulse-charging regime of the power system by:
- controlling a first power flow from the external power source to the power system, wherein controlling the first power flow from the external power source to the power system comprises cyclically switching the first power flow between charging the battery module in a first time period and not charging the battery module in a second time period in a pulse-charging manner; and
- controlling a second power flow between the supercapacitor module and battery module, wherein controlling the second power flow between the supercapacitor module and the battery module comprises charging the battery module from the supercapacitor module in the first time period.

In this way, the second power flow from the supercapacitor module to the battery module boosts the first power flow from the external power source to the battery module during the first time period. This provides multiple advantages over typical pulse charge techniques. By boosting of the current flow from the external power source into the battery module using the supercapacitor module, a lower power external power source can be used for pulse charging. For example, a high power wall adapter is not required to achieve fast pulse charging, and instead a less powerful supply such as a lower power USB appliance or port in another device can be used. This provides advantages including reductions in cost, reductions in losses and improvements in efficiency, greater flexibility in device design and reductions in device size.

Preferably, controlling the first power flow further comprises charging the supercapacitor module from the external power source during the second time period.

In this way, the supercapacitor module is recharged for the first time period of the next cycle.

Preferably, controlling the first power flow further comprises not charging the supercapacitor module from the external power source during the first time period.

Preferably, controlling the second power flow further comprises not charging the battery module from the supercapacitor module in the second time period.

In this way, the battery module is rested during the second time period. This can improve the longevity of the battery module.

Preferably, the first power flow comprises a substantially constant current flow into the power system.

Preferably, the battery module comprises at least one battery and/or at least one removable power bank.

Preferably, the supercapacitor module contains two or more supercapacitors connected in series.

In this way, multiple smaller supercapacitors can be used to improve design flexibility.

Preferably, the power system comprises the supercapacitor module connected in parallel with the battery module, with a voltage converter connected between the supercapacitor module and the battery module.

Preferably, the voltage converter is configured to step-down the voltage of the second power flow from supercapacitor module to battery module in the first time period.

Preferably, the power system further comprises a first switching means connected between the battery module and the supercapacitor module, wherein the first switching means is controlled by the controller to switch between charging the battery module in a first time period and not charging the battery module in a second time period.

In this way, the switching of the power flow between the first time period and second time period can be efficiently achieved.

Preferably, the first switching means comprises a transistor controlled by the controller.

In a second aspect there is provided a system comprising the aerosol generation device of the first aspect, and the external power source.

Preferably, the external power source is a power adapter connectable to a mains supply and/or a power bank, a docking station configured to receive the aerosol generation device, or a portable charging case configured to receive the aerosol generation device.

In a third aspect, there is provided a method of controlling a pulse-charging regime of a power system of an aerosol generation device, the power system comprising a supercapacitor module and a battery module and connectable to an external power source and the method comprising:
- controlling a first power flow from the external power source to the power system, wherein controlling the first power flow from the external power source to the power system comprises cyclically switching the first power flow between charging the battery module in a first time period and not charging the battery module in a second time period in a pulse-charging manner; and controlling a second power flow between the supercapacitor module and battery module, wherein controlling the second power flow between the supercapacitor module and the battery module comprises charging the battery module from the supercapacitor module in the first time period.

Optionally, the third aspect can comprise the preferable features of the first aspect.

In a fourth aspect, there is provided a non-transitory computer-readable medium storing instructions that when executed by one or more processors of a controller configured for operation with an aerosol generation device power system comprising a supercapacitor module and a battery module, connectable to an external power source, cause the one or more processors to control a pulse-charging regime of a power system by:

controlling a first power flow from the external power source to the power system, wherein controlling the first power flow from the external power source to the power system comprises cyclically switching the first power flow between charging the battery module in a first time period and not charging the battery module in a second time period in a pulse-charging manner; and controlling a second power flow between the supercapacitor module and battery module, wherein controlling the second power flow between the supercapacitor module and the battery module comprises charging the battery module from the supercapacitor module in the first time period.

Optionally, the fourth aspect can comprise the preferable features of the first aspect.

BRIEF DESCRIPTION OF THE DRAWINGS

Embodiments of the invention are now described, by way of example, with reference to the drawings, in which.

DETAILED DESCRIPTION

Figure 1:
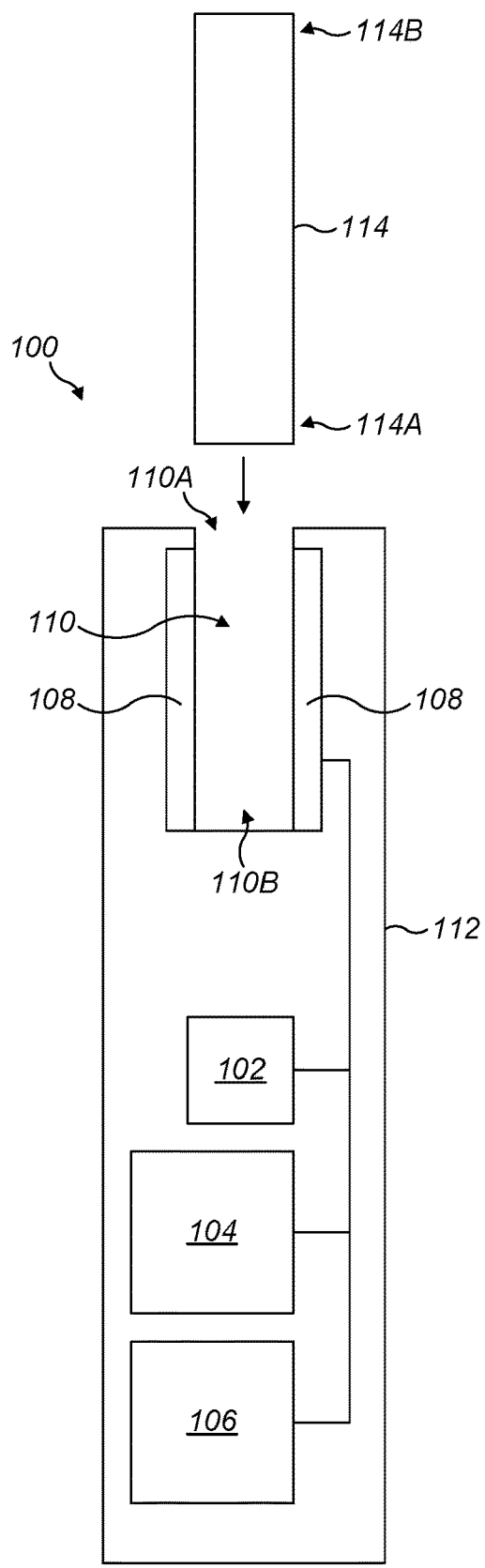
FIG. 1 is a block diagram of an aerosol generation device.

FIG. 1 shows a block diagram of the components of an aerosol generation device 100 or a vapor generation device, also known as an electronic cigarette. For the purposes of the present description, it will be understood that the terms vapor and aerosol are interchangeable.

The aerosol generation device 100 has a body portion 112 containing controller 102, and a power system comprising a first energy storage module 104 and a second energy storage module 106. The power system is operable in a plurality of selectable operating modes. Herein only one first energy storage module 104 and one second energy storage module 106 are referred to; the skilled person will however understand that the power system can comprise one or more first energy storage modules and one or more second energy storage modules as appropriate. The controller 102 is configured to control a power flow of the first energy storage module 104 and the second energy storage module 106 based on the selected operating mode, as will be subsequently described. The controller 102 can be at least one microcontroller unit comprising memory, with instructions stored thereon for operating the aerosol generation device 100 including instructions for executing the selectable operating modes and controlling the power flows, and one or processors configured to execute the instructions.

In some examples, the first energy storage module 104 is a supercapacitor module 104 and the second energy storage module 106 is a battery module 106.

In an example, a heater 108 is contained with the body portion 112. In such an example, as shown in FIG. 1, the heater 108 is arranged in a cavity 110 or chamber in the body portion 112. The cavity 110 is accessed by an opening 110A in the body portion 112. The cavity 110 is arranged to receive an associated aerosol generating consumable 114. The aerosol generating consumable can contain an aerosol generating material, such as a tobacco rod containing tobacco. A tobacco rod can be similar to a traditional cigarette. The cavity 110 has cross-section approximately equal to that of the aerosol generating consumable 114, and a depth such that when the associated aerosol generating consumable 114 is inserted into the cavity 110, a first end portion 114A of the aerosol generating consumable 114 reaches a bottom portion 110B of the cavity 110 (that is, an end portion 110B of the cavity 110 distal from the cavity opening 110A), and a second end portion 114B of the aerosol generating consumable 114 distal to the first end portion 114A extends outwardly from the cavity 110. In this way, a consumer can inhale upon the aerosol generating consumable 114 when it is inserted into the aerosol generation device 100. In the example of FIG. 1, the heater 108 is arranged in the cavity 110 such that the aerosol generating consumable 114 engages the heater 108 when inserted into the cavity 110. In the example of FIG. 1, the heater 108 is arranged as a tube in the cavity such that when the first end portion 114A of the aerosol generating consumable is inserted into the cavity the heater 108 substantially or completely surrounds the portion of the aerosol generating consumable 114 within the cavity 110. The heater 108 can be a wire, such as a coiled wire heater, or a ceramic heater, or any other suitable type of heater. The heater 108 can comprise multiple heating elements sequentially arranged along the axial length of the cavity that can be independently activated (i.e. powered up) in a sequential order.

In an alternative embodiment (not shown), the heater can be arranged as an elongate piercing member (such as in the form of needle, rod or blade) within the cavity; in such an embodiment the heater can be arranged to penetrate the aerosol generating consumable and engage the aerosol generating material when the aerosol generating consumable is inserted into the cavity.

In another alternative embodiment (not shown), the heater may be in the form of an induction heater. In such an embodiment, a heating element (i.e., a susceptor) can be provided in the consumable, and the heating element is inductively coupled to the induction element (i.e., induction coil) in the cavity when the consumable is inserted into the cavity. The induction heater then heats the heating element by induction.

The heater 108 is arranged to heat the aerosol generating consumable 114 to a predetermined temperature to produce an aerosol in an aerosolisation session. An aerosolisation session can be considered as when the device is operated to produce an aerosol from the aerosol generating consumable 114. In an example in which the aerosol generating consumable 114 is a tobacco rod, the aerosol generating consumable 114 comprises tobacco. The heater 108 is arranged to heat the tobacco, without burning the tobacco, to generate an aerosol. That is, the heater 108 heats the tobacco at a predetermined temperature below the combustion point of the tobacco such that a tobacco-based aerosol is generated. The skilled person will readily understand that the aerosol generating consumable 114 does not necessarily need to comprise tobacco, and that any other suitable substance for aerosolisation (or vaporisation), particularly by heating without burning the substance, can be used in place of tobacco.

In an alternative, the aerosol generating consumable can be a vaporisable liquid. The vaporisable liquid can be contained in a cartridge receivable in the aerosol generation device, or can be directly deposited into the aerosol generation device.

The controller 102 is arranged to control the power flow of the first energy storage module 104 and the second energy storage module 106 based upon a selected operating mode of the aerosolisation session.

Figure 2:
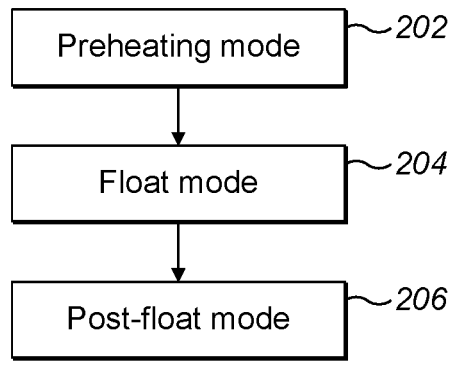
FIG. 2 is a flow diagram of operating modes of an aerosol generation device.

The progression from the preheating mode, to the float mode and then to the post-float mode can be understood from FIG. 2.

In the preheating mode 202, the heater 108 associated with the aerosol generation device 100 is heated to a predetermined temperature for the generation of an aerosol from the aerosol generating consumable 114. A preheating phase can be considered the time during which the preheating mode is being executed, for example the time it takes for the heater 108 to reach the predetermined temperature. The pre-heating mode occurs during a first time period of the aerosolisation session. In an example, the first time period can be a fixed pre-determined time period. In other examples, the first time period can vary corresponding to the length of time needed to heat the heater 108 to the predetermined temperature.

When the heater reaches the predetermined temperature, the controller 102 ends the preheating mode 202 and controls the power system to perform the float mode 204. In the float mode 204 the controller 102 controls the power flow from the power system to maintain the heater 108 substantially at the predetermined temperature so that an aerosol is generated for the consumer to inhale. A float phase can be considered the time during which the float mode is being executed, for example the time during which the heater 108 is aerosolising one (or at least part of one) aerosol generating consumable 114 after the preheating phase. The controller 102 can control the power system to operate the float mode for a second time period of the aerosolisation session. The second time period can be predetermined and stored at the controller 102.

Following the expiration of the second time period, the controller 102 switches the operating mode to the post-float mode 206. In the post-float mode the controller 102 disables the power flow from the power system to the heater so that the heater is no longer being powered. The heater retains residual heat energy despite the power flow having been disabled. This residual heat is used to continue heating the consumable in the post-float mode. A post-float phase can be considered the time during which the post-float mode is being executed. The post-float phase corresponds to a third time period of the aerosolisation session.

Figure 3:
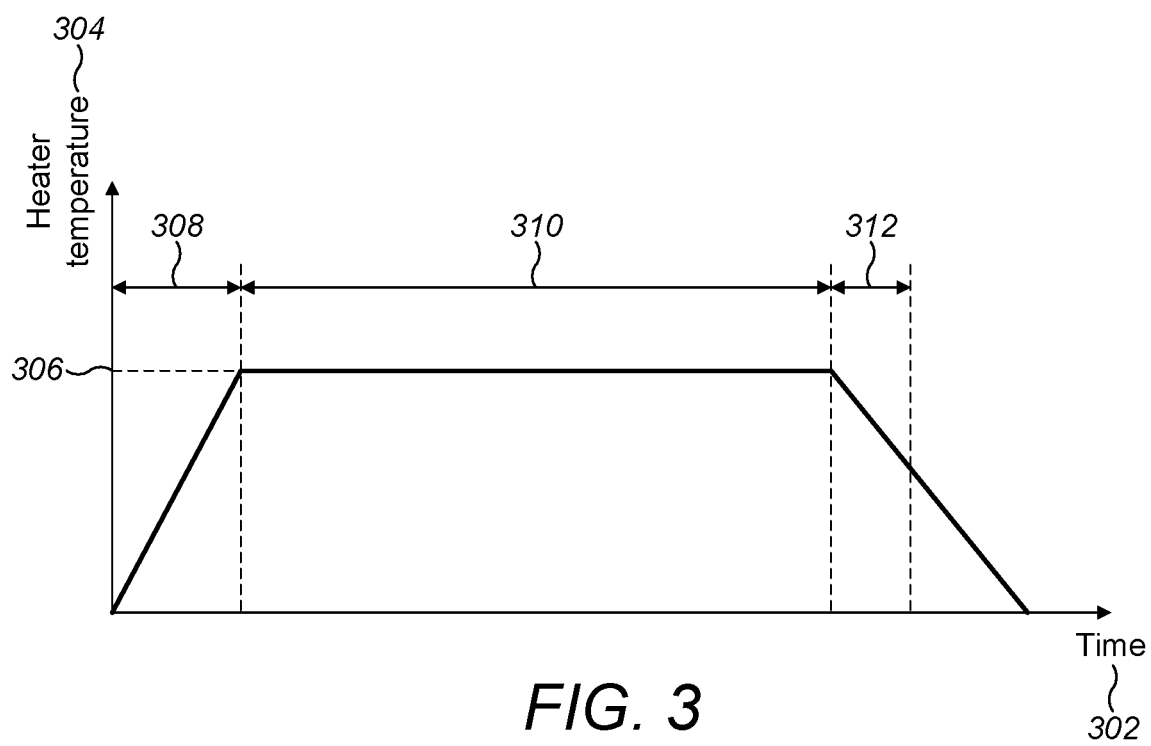
FIG. 3 is a plot of heater temperature against time for an aerosolisation session.

FIG. 3 shows an exemplary plot of heater temperature 304 against time 302. In the pre-heating phase the controller 102 controls the power system to apply power to the heater for the first time period 308, until the heater temperature reaches the predetermined temperature 306. In an example, the predetermined temperature is 230° C. In an example, the first time period is 20 seconds. In some examples, the controller 102 is configured to heat the heater to the predetermined temperature within a fixed predetermined first time period. In other examples the first time period varies depending on how long the heater takes to reach the predetermined temperature.

When the heater reaches the predetermined temperature 306, the controller 102 switches the operating mode to the float mode for the second time period 310 and maintains the heater temperature substantially at the predetermined temperature 306 for this second time period 310. In an example, the second time period may be 250 seconds.

Following the expiration of the second time period 310, the controller 102 switches the operating mode to the post-float mode for the third time period 312. As the third time period 312 progresses, the heater temperature drops as power is no longer being applied. The third time period 312 can be configured such that its expiration coincides with the heater temperature dropping below a threshold. This threshold can correspond to a temperature above ambient temperature, but below which the consumable is no longer usefully being heated. In an example, the third time period may be 20 seconds.

Following the expiration of the third time period 312 the user of the aerosol generation device may be informed that the aerosolisation session has ended, by way of a visual or audible indicator, so that they are aware that the consumable is no longer being aerosolised.

Figure 4:
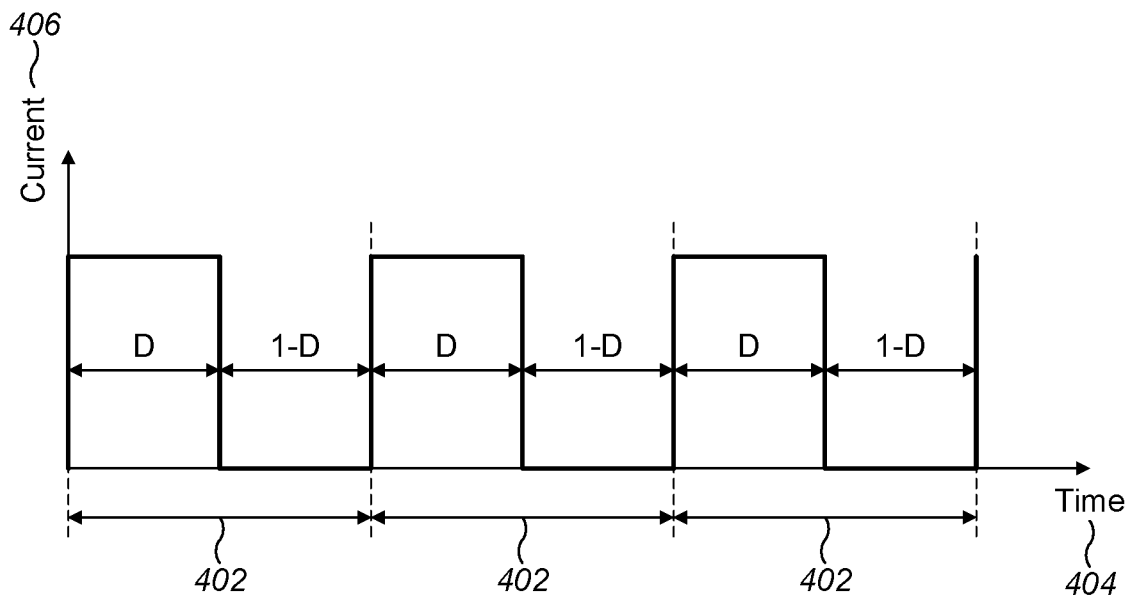
FIG. 4 is a plot of a pulse width modulated power flow.

In the preheating and float modes, the controller 102 controls the power flow from the power system to the heater such that the power flow is a pulse width modulated power flow having one or more pulse width modulation cycles. An exemplary pulse width modulated power flow is presented in FIG. 4. A pulse width modulated power flow comprises one or more pulse width modulation (PWM) cycles 402 (also known as pulse width modulation switching periods). A single PWM cycle, or switching period, 402 comprises one PWM cycle "on period" D and one PWM cycle "off period" 1−D. The combination of the PWM cycle on period D and the PWM cycle off period 1−D forms the overall PWM cycle or switching period 402.

During the PWM on period of the PWM cycle, power is applied to the heater, that is a power line to heater is closed by a switch that implements the PWM control. During the PWM off period power is not applied to heater, that is the power line to the heater is opened by a switch that implements the PWM control. As such, one pulse width modulation cycle 402 comprises the power being switched once between an on state and an off state, and a pulse width modulated power flow therefore comprises continuously powering the heater with a power flow which is rapidly switched between PWM on periods and off periods with a duty cycle.

The pulse width modulation duty cycle corresponds to the on period (D) as a proportion of the total period (D+(1−D)) of the cycle 402 (i.e. the combined "on period" and "off period" of the switching period 402).

The pulse width modulated power flow, comprising a plurality of PWM cycles, continuously powers the heater with the average power of the PWM on period and the PWM off period based upon the duty cycle. Controlling the duty cycle controls the amount of power delivered to the heater. A higher duty cycle for the pulse width modulated power flow delivers a higher average power; a lower duty cycle for the pulse width modulated power flow delivers a lower average power. That is, for a higher duty cycle a greater proportion of the cycle 402 is the "on period" D than for a lower duty cycle. In this way, careful control of the level of power applied to the heater can be achieved by controlling the duty cycle of the pulse width modulated power flow.

In the float mode, the controller 102 is configured to control the power system to apply the pulse width modulated power flow to the heater with a first duty cycle regime to maintain the heater substantially at the predetermined aerosol generation temperature. In the preheating mode, the controller 102 is configured to control the power system to apply the pulse width modulated power flow to the heater with a second duty cycle regime, different to the first duty cycle regime, to heat the heater to the aerosol generation temperature. The second duty cycle regime can have a higher duty cycle than the first duty cycle regime, in this way a greater amount of power is applied to the heater to rapidly heat it to the predetermined temperature, whilst a lower amount of power is used to maintain the heater at the predetermined temperature. The first duty cycle regime comprises one or more PWM cycles with a first duty cycle ratio D1, and the second duty cycle regime comprises one or more PWM cycles with a second duty cycle ratio D2; the relationship between D1 and D2 can be considered as D2=D1*K, where K is a coefficient that is >>1 and can be selected as an implementation choice; the theoretical maximum duty cycle is 1 with no off period, or close to but less than 1 with a very short off period. In examples, the first duty cycle regime comprises one or more duty cycles with duty cycle ratios much less than 1 and the second duty cycle regime comprises one or more duty cycles with duty cycle ratios near to but less than 1. In other examples, the first duty cycle regime comprises one or more duty cycles with duty cycle ratios <<0.5 and the second duty cycle regime comprises one or more duty cycles with duty cycle ratios ≥0.5. In further examples, the first duty cycle is configured such that <3 W is applied in the float mode, and the second duty cycle is configured such that approximately 16 W is applied in the preheating mode.

In some examples, the PWM power flow in the float mode can be considered a first PWM power flow, and the PWM power flow in the pre-heating mode can be considered a second PWM power flow.

In the float mode the controller 102 is configured to control the second energy storage module to charge the first energy storage module during the pulse width modulation cycle off period. In this way, the first energy storage module can be incrementally charged during the float mode thereby increasing the time for which it is able to power the heater. This allows the first energy storage module to be smaller.

In the post-float mode, the controller 102 is configured to control the second energy storage module 106 to constantly charge the first energy storage module 106 until the first energy storage module 104 is fully charged. In this way, the first energy storage module is sufficiently charged for the pre-heating mode in a subsequent aerosolisation session.

FIG. 5A presents a specific implementation of the power system 500 described with reference to FIGS. 1 to 4.

In the power system 500 of FIG. 5A, the first energy storage module 504 is a supercapacitor module 504 and the second energy storage module 506 is a battery module 506. The supercapacitor module 504 comprises one or more supercapacitors, and the battery module 506 comprises one or more batteries.

In a specific example, the supercapacitor module 504 can be implemented as two supercapacitors connected in series. These supercapacitors can be traditional-type supercapacitors and each can have a voltage of 2.5 V thereby providing the supercapacitor module 504 with a total voltage of 5 V. As such, the voltage (U2) of the supercapacitor module 504 can be 5 V. In other examples, a plurality of supercapacitors can be connected in series to meet the voltage requirements needed for powering the heater. Connecting a plurality of smaller supercapacitors in series, rather than using a single larger supercapacitor, is advantageous in allowing greater design flexibility.

The battery module 506 can be implemented as a single battery. This can be a high energy battery, such as a battery using lithium-ion technology, aluminium-ion technology, or zinc-ion technology, or any other suitable type of battery. Alternatively, the battery module can comprise a plurality of batteries. In a specific example, the battery is a lithium-ion battery with a voltage of 3.7 V. As such, the voltage (U1) of the battery module 506 can be 3.7 V. The battery module 506 can be integrated into the aerosol generation device 100. In other examples, the battery module 506 can be a power bank that is attachable/detachable from the aerosol generation device 100 rather than a battery specifically integrated into the device 100. The battery module 506 need not exclusively be an integrated battery or a separate power bank, rather the battery module can utilise a combination of the two; when the integrated battery is fully discharged the power bank can be connected and the aerosolisation session can be performed without first needing to recharge the integrated battery.

The supercapacitor module 504 and the battery module 506 are connected in parallel with a DC/DC voltage converter 530 arranged between the two. The DC/DC voltage converter 530 is arranged to step up the battery module voltage in order to charge the supercapacitor module 504 from the battery module 506. A first switching means 522 is arranged between the battery module 506 and the converter 530. The supercapacitor module 504 is connectable to the heater 508, represented as the load 508, in parallel with a second switching means 524 arranged between the two. The heater 508 is not itself a component of the power system 500, but rather is powered by the power system 500. The first switching means 522 and the second switching means 524 can be transistors connected to the controller 102 (not shown in FIG. 5A).

During the preheating mode and the float mode, controlling the pulse width modulated power flow of the power system 500 comprises controlling the supercapacitor module 504 to power the heater 508 and the battery module 506 to recharge the supercapacitor module 504. Only the supercapacitor module 504 powers the heater 508 in the preheating mode and the float mode; the battery module 506 recharges the supercapacitor module 504. During the PWM cycle on periods of the pulse width modulated power flow, the supercapacitor module 504 powers the heater, and during the PWM cycle off periods the battery module 506 recharges the supercapacitor module 504. That is, during the preheating mode and the float mode the supercapacitor module 504 switches between powering the heater 508 during the on portion of the duty cycle, and being recharged by the battery module 506 during the off portion of the duty cycle. The battery module 506 does not charge the supercapacitor module 504 during the on portion of the duty cycle.

The pulse width modulated power flow in the float mode operates with a first duty cycle regime that comprises one or more PWM cycles with a first duty cycle ratio D1. In the preheating mode, the supercapacitor module 504 powers the heater 508 with a pulse width modulated power flow with a second duty cycle regime that comprises one or more PWM cycles with a second duty cycle ratio D2. The relationship between D1 and D2 can be considered as D2=D1*K, where K is a coefficient that is >>1 and can be selected as an implementation choice. In an example, the first duty cycle ratio can be much less than 1, and the second duty cycle ratio can be close to but less than 1. In other examples, the first duty cycle ratio can be <<0.5 and the second duty cycle ratio can be ≥0.5. In further examples, the first duty cycle is configured such that <3 W is applied in the float mode, and the second duty cycle is configured such that approximately 16 W is applied in the preheating mode.

The controller 102, the first switching means 522, and the second switching 524 bring about this control over the heating and charging. During the PWM cycle on periods of the pulse width modulated power flow, the controller 102 controls the second switching means 524 to be closed and the first switching means 522 to be open. In this way, power flows from the supercapacitor module 504 to the heater 508 during the PWM on period whilst the battery module 506 is isolated from the supercapacitor module 504 and the heater 508. During the PWM cycle off periods of the pulse width modulated power flow, the controller 102 controls the second switching means 524 to be open and the first switching means 522 to be closed. In this way, power flows from the battery module 506 into the supercapacitor module 504 to recharge the supercapacitor module 504 whilst the supercapacitor module 504 is isolated from the heater 508. As such, during the pulse width modulated power flow, a rapid switching occurs between powering the heater 508 in the PWM cycle on periods and recharging the supercapacitor module 504 in the PWM cycle off periods.

In some examples, there may be a small delay between opening the first switching means 522 and closing the second switching means 524. This prevents the power flow from the battery module 506 inadvertently reaching the heater 508 during the on period of the duty cycle of the pulse width modulated power flow.

Figure 5A:
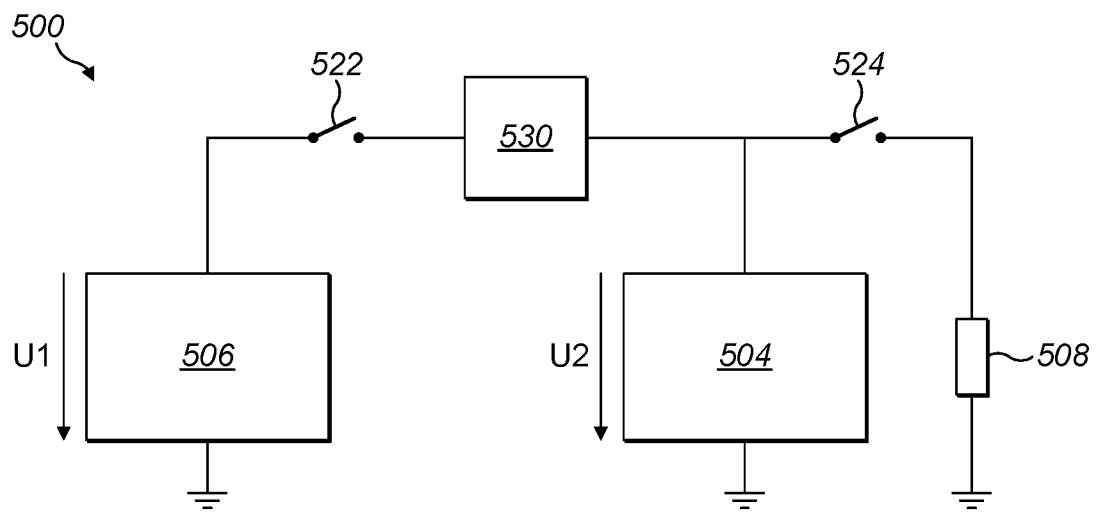
FIG. 5A is a circuit diagram of a power system comprising a supercapacitor module and a battery module.
Figure 5B:
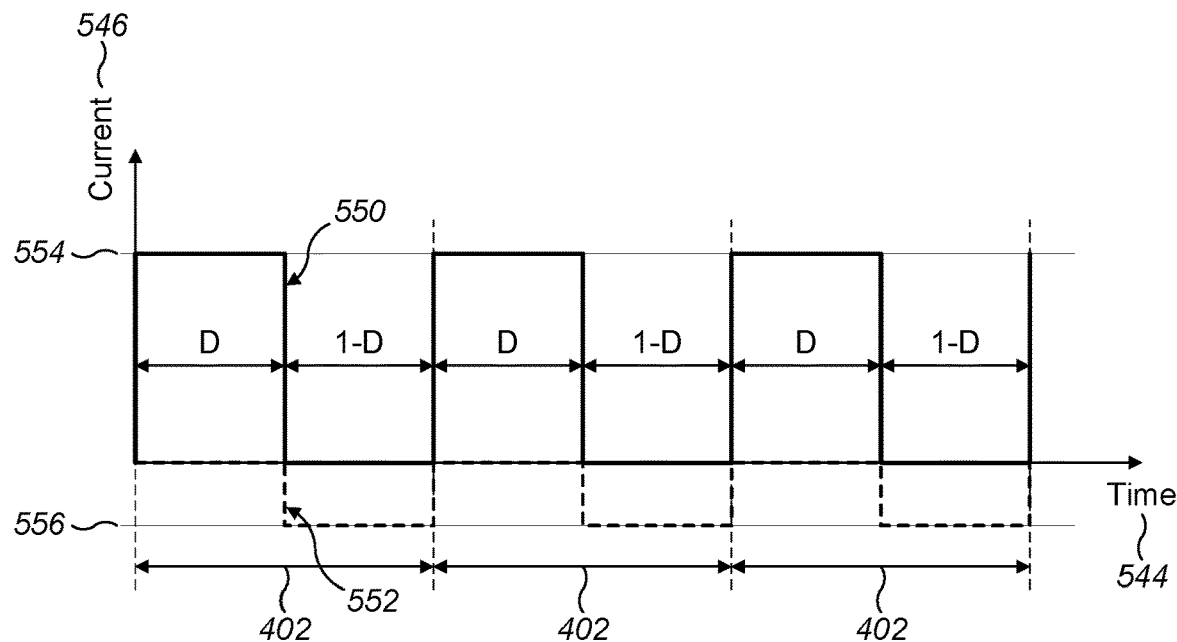
FIG. 5B is a plot of current against time for a pulse width modulated power flow into and out of the supercapacitor module of the power system of FIG. 5A.

FIG. 5B shows a plot of current 546 against time 544 for the pulse width modulated power flow into and out of the supercapacitor module during an exemplary portion of the preheating mode or the float mode. During the PWM cycle on period (D) of the switching period 402, power flows out of the supercapacitor module 504 with a first amplitude 554. The solid line 550 indicates the power flow out of the supercapacitor module 504, and the punctuated line 552 indicates the power flow into the supercapacitor module 504. During the PWM cycle off period (1−D) power flows into the supercapacitor module 504 with a second amplitude 556. In this way, the power flow 552 into the supercapacitor module 504 during the PWM cycle off period (1−D) at least partially compensates for the power flow 550 out of the supercapacitor module 504 during the PWM cycle on period. In an example, the first amplitude 554 is A and the second amplitude 556 is 2 A.

During the post-float mode, the controller 102 controls the first switching means 522 to be closed and the second switching means 524 to be open. As such, the power flow to the heater 508 is disabled and the supercapacitor module 504 no longer powers the heater 508. As the first switching means 522 is closed, the battery module 506 constantly charges the supercapacitor module 504 until the supercapacitor module 504 is fully charged. In this way, the supercapacitor module 504 will have an adequate charge level for the pre-heating mode of a subsequent aerosolisation session.

Figure 5C:
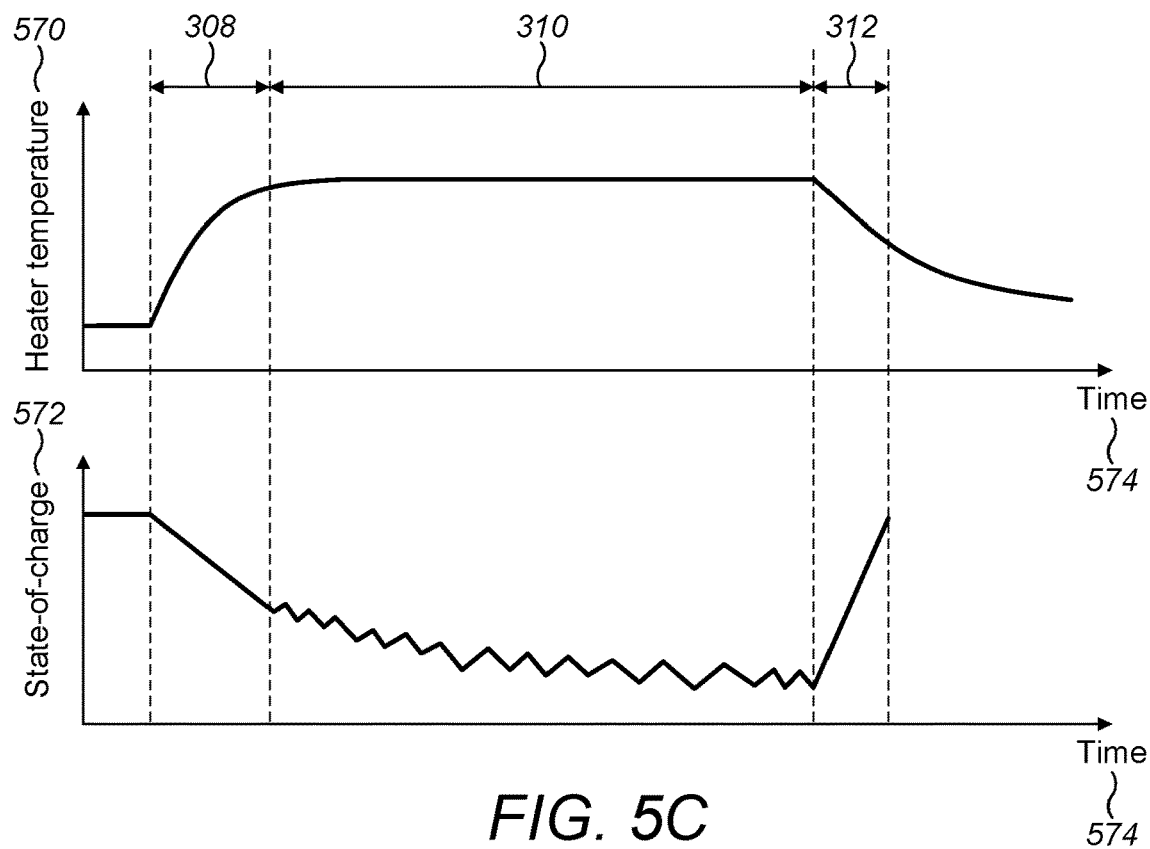
FIG. 5C is a dual plot of heater temperature against time and the state of charge of the supercapacitor module against time for an aerosolisation session using the power system of FIG. 5A.

FIG. 5C shows a dual plot of the temperature 570 of the heater 508 against time 574, and the corresponding state of charge 572 of the supercapacitor module 504 against time 574 for the aerosolisation session comprising the preheating mode 308, the float mode 310 and the post-float mode 312.

During the preheating mode 308, the heater 508 is powered by the supercapacitor module 504, for example with a high duty cycle, and the temperature of the heater 508 increases to the predetermined temperature; during this pre-heating 308, the charge level of the supercapacitor module 504 drops as it powers the heater 508.

In the float mode 310 the heater 508 is powered by the supercapacitor module 504 and maintained at the predetermined temperature. As described, the pulse width modulated power flow is configured such that the supercapacitor module 504 applies power to the heater 508 during the PWM cycle on period, and the battery module 506 recharges the supercapacitor module during the PWM cycle off period. As such, the charge level of the supercapacitor module 504 drops during the PWM cycle on periods, and raises during the PWM cycle off periods of the pulse width modulated power flow. This is visually represented by the rising and falling of the supercapacitor module 504 charge level 572 as a function of time 574 in FIG. 5C, during the float mode 310. As the inflow of charge to the supercapacitor module 504 from the battery module 506 during the PWM cycle off periods does not completely balance the outflow of charge to the heater 508 during the PWM cycle on periods, the charge level of the supercapacitor module 504 has an overall downward trend over the course of the float mode 310. This overall decrease in the charge level of the supercapacitor module 504 is slower than if the incremental charging during the PWM cycle off period were not be applied. As such, the supercapacitor module 504 is able to provide power to the heater 508 for a greater amount of time due to the incremental recharging during the PWM cycle off period.

In the post-float mode 312 the supercapacitor module 504 is no longer powering the heater 508 and as such the heater temperature drops. During the post-float mode, the battery module 506 is constantly charging the supercapacitor module 504 thereby increasing charge level of the supercapacitor module 504 until it is fully charged. The battery module 506 can slowly charge the supercapacitor module 504, thereby only requiring a low maximum current; this reduces the stress on the battery and improves its longevity.

The battery module 506 is capable of storing enough charge to recharge the supercapacitor module 504 for a plurality of aerosolisation sessions. When the charge level in the battery module 506 is depleted, the device 100 can be connected to a separate external power source such as a mains charger, a USB charger or a power bank to recharge the battery module 506.

In examples in which a power bank can be connected to the aerosol generation device 100, the power bank can act as the battery module 506 and can charge the supercapacitor module 504 during the PWM cycle off periods of the pulse width modulated power flow. In this way, if the internal battery module has depleted charge, an aerosolisation session can still be performed, but with the power bank performing the operations otherwise performed by the internal battery module. This allows the operator to perform an aerosolisation session without having to first charge the internal battery module.

The pulse width modulated power regime, powering the heater 508 with the supercapacitor module 504 during the PWM cycle on periods of the pulse width modulated power flow, and recharging supercapacitor module 504 with the battery module 506 during the PWM cycle off periods of the pulse width modulated power flow, is advantageous as the incremental recharging during the off period ensures that the supercapacitor module 504 continues to have enough charge to power the heater throughout the float mode. Furthermore, this incremental recharging of the supercapacitor module 504 means that the supercapacitor module has low energy capacity requirements (in an example <0.05 Wh is needed per aerosolisation session) thereby allowing smaller sized supercapacitors to be used, which reduces costs and improves safety.

Without the recharging during the PWM cycle off period, the charge level of the supercapacitor would run low sooner and prevent the supercapacitor module 504 from being able to power the heater 508 for the entire float mode without the additional support of a power flow from a battery to the heater 508.

Powering a heater directly with a battery, or supporting the power flow from a supercapacitor to a heater with a power flow from a battery to the heater can be disadvantageous if a step-up converter is required due to a battery typically having a lower voltage level than that required to power the heater. Such a step-up converter can introduce losses to the system. As the supercapacitor module 504 has a higher voltage level than a battery, a step-up converter is not needed when powering the heater only with the supercapacitor module 504. This obviates the losses associated with such a loss-inducing step-up.

In another advantage, the supercapacitor module 504 has a lower internal resistance than a typical battery thereby reducing losses in the system compared to a system in which the heater is powered by a battery.

When the charge level of the battery module is depleted, it can be recharged using a pulse charging protocol, as will be described subsequently.

Figure 6A:
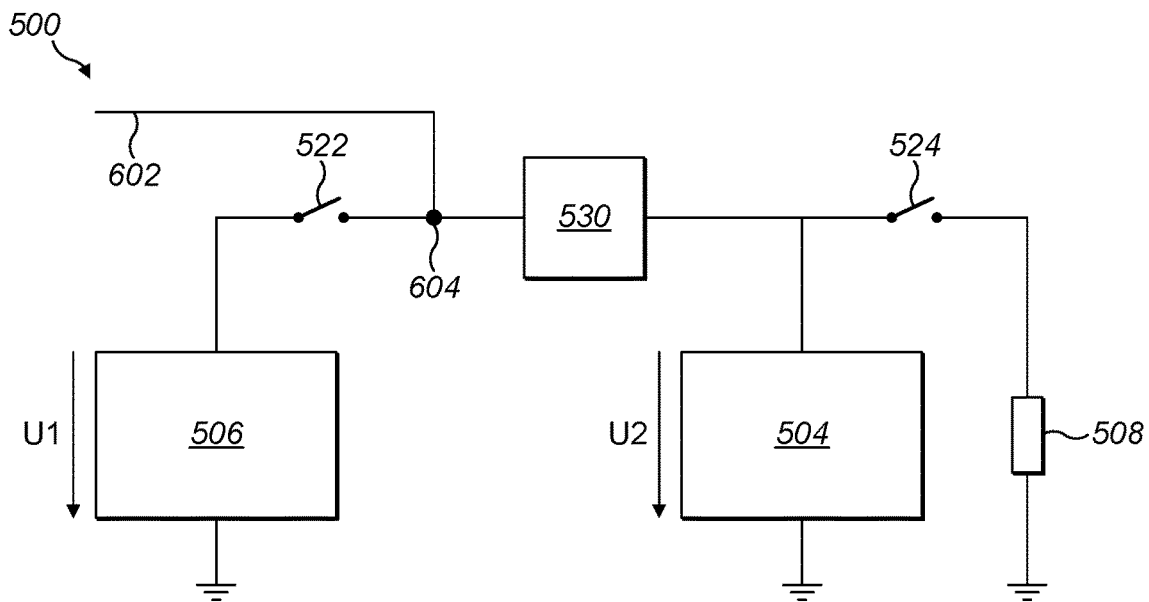
FIG. 6A is a circuit diagram of the power system of FIG. 5A connected to an external power source.

FIG. 6A depicts an exemplary circuit diagram presenting the power system 500 described with reference to FIG. 5A configured to be charged in a pulsed manner. The circuit corresponds to that of FIG. 5A, with an external power source 602 (external to the power system 500 of the aerosol generation device) connected to node 604, between the first switching means 522 and the DC/DC voltage converter 530. The power system 500 is configured to be controlled such that the external power source 602 is used to charge the battery module 506 by pulse charging. The external power source 602 provides power to the power system 500 from an external supply such as a mains supply, power bank, laptop, docking/charging station, portable charging case or the like. The external power source 602 can include a power adapter configured to connect to the mains supply, a power bank, a USB port in a separate appliance, or the like.

In a specific example in which the external power source 602 is a portable charging case, the charging case can be dimensioned to receive and accommodate the aerosol generation device within a chamber. The charging case comprises a battery which connects to node 604 when the aerosol generation device is received in the charging case. In this way, when the operator inserts the aerosol generation device into the charging case, the power system 500 is brought into connection with the battery comprised in the charging case to charge the power system. The battery of the charging case can store enough energy to fully recharge the power system 500 a plurality of times. The battery of the charging case can itself be charged from an external power source, such as a power bank or mains source, by a connection such as a USB cable, or through connection to a docking station. In an example use process, the operator removes the aerosol generation device from the charging case, where it has been charging, carries out an aerosolisation session (or a plurality of aerosolisation sessions), and then reinserts the aerosol generation device into the charging case to charge the power system 500 for future aerosolisation sessions. The power system 500 can be configured to store enough charge for a first predetermined number of aerosolisation sessions or puffs. The portable charging case can be configured to store enough charge to recharge the power system 500 for a second predetermined number of aerosolisation sessions or puffs that is greater than the first predetermined number of aerosolisation sessions of puffs. The pulse charging protocol (subsequently described) is particularly beneficial for a portable charging case as it allows for a smaller maximum discharge current from the battery of the charging case, which allows for better energy density, which itself allows for having more capacity in the same size battery. The greater capacity allows for more recharging cycles from the portable charging case per full charge of the battery of the portable charging case.

Figure 6B:
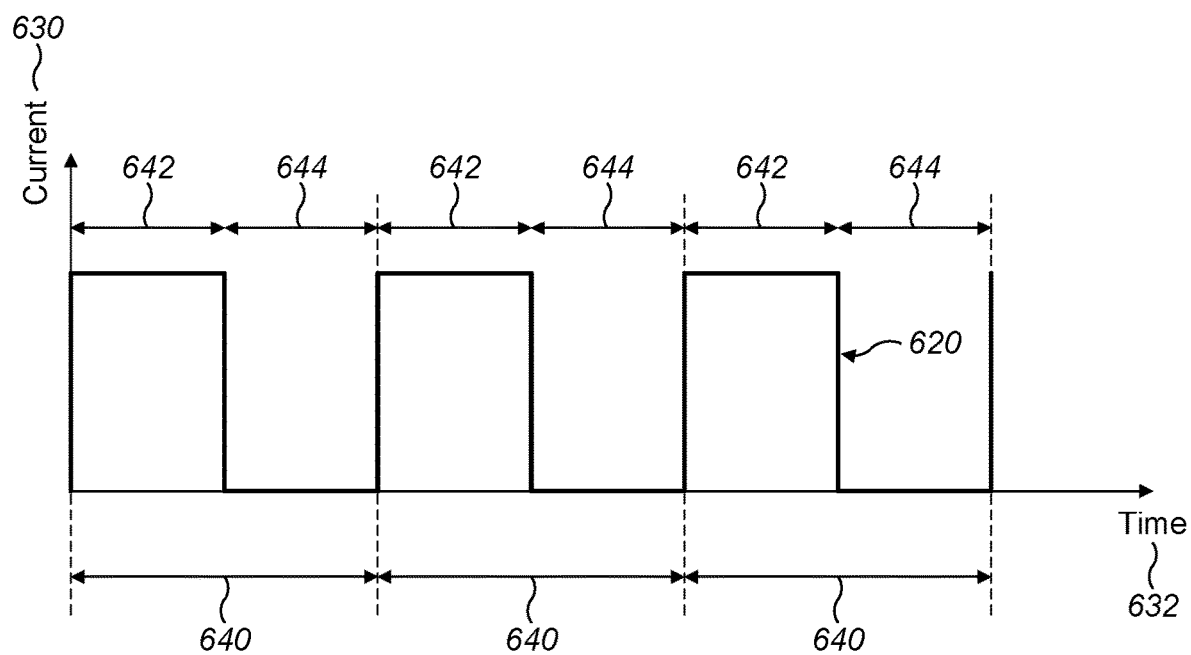
FIG. 6B is a plot of current against time for a pulse charging protocol.

FIG. 6B presents a plot of current 630 against time 632 for a typical pulse charging protocol. As depicted in FIG. 6B, in pulse charging, the current flow 620 into the battery is supplied in a pulsed manner. The pulse charging current flow 620 to the battery module 506 comprises one or more pulse cycles 640. A pulse cycle 640 has a first time period 642 in which the current is directed into the battery to charge the battery, and a second time period 644 in which the current is not directed to the battery to allow the battery to rest. The first time period 642 and the second time period 644 are distinct time periods which together form the overall pulse cycle 640. The first time period 642 and the second time period 644 can be the same or different lengths of the time. The switching between the first time period 642 and the second time period 644 defines the pulse rate of the pulse charging.

Pulse charging requires a much higher current rate than a traditional constant-current, constant-voltage charging approach. In pulse charging a higher current has to be injected in the pulse. For example, for pulse charging to charge a lithium-ion battery faster than a traditional charging protocol, with a maximum current rate of 1 A, the current rate for the pulse should >>1 A. In this example, if a charging time of 0.5 hours is taken, charging continuously using the traditional charging protocol with 1 A will charge 1 A*0.5 hours=0.5 Ah into the battery. For pulse charging, if the accumulated pulse time equals half of the 0.5 hours, for example, the current rate would need to be >2 A to inject a higher charge into the battery (charging to a higher state of charge) than the traditional charging protocol.

It follows that the maximum required current rate for fast pulse charging is much higher than for traditional charging if a low charging time is required. Providing such current to the power system 500 faces a number of challenges. The maximum current and/or power required from the external power source 602 (such as a wall adapter) is very high, which significantly increases hardware costs. The very high current also leads to increased energy losses during charging. The requisite charging electronics to accommodate the high current and/or power need to be large in size, causing additional cost, as well as inconvenience for the operator due to increased device size and/or weight. There can also be an impact on the size of the device to accommodate energy losses (heat) that need to be dissipated. These challenges are addressed by the power system 500 described with reference to FIG. 6A.

Returning to FIG. 6A, the power system 500 is configured in a first state in the first time period, and in a second state in the second time period. The controller 102 controls the power system 500 to switch once between the first state and the second state in each pulse cycle to provide the pulse charging power flow to the battery module 506. As such, the pulse charging power flow cyclically switches between charging the battery in the first time period of each pulse cycle and not charging the battery in the second time period of each pulse cycle. When the pulse charging power flow comprises a plurality of pulse cycles, the pulse charging power flow repeatedly switches between charging the battery and not charging the battery in a cyclical manner.

The controller 102 (not shown in FIG. 6A) of the power system 500 of FIG. 6A controls the pulse-charging regime by controlling a first power flow from the external power source 602 to cyclically switch between charging the battery module 506 in the first time period and not charging the battery module 506 in the second time period. Controlling the first power flow further comprises charging the supercapacitor module 504 from the external power source 602 during the second time period. The first power flow, from the external power source 602, can be a substantially constant current flow. Controlling the first power flow can further comprise not charging the supercapacitor module 504 from the external power source 602 during the first time period.

The controller 102 further controls the pulse-charging by controlling a second power flow between the supercapacitor module 504 and battery module 506 to charge the battery module 506 from the supercapacitor module 504 in the first time period. Controlling the second power flow further can comprise not charging the battery module 506 from the supercapacitor module 504 in the second time period.

That is, in the first time period, the controller 102 controls the power system 500 such that the first power flow from the external power source 602 charges the battery module 506. At the same time, the controller 102 also controls the second power flow from the supercapacitor module 504 to charge the battery module 506 in the first time period. This is brought about by the controller 102 configuring the power system 500 to be in the first state. As described with reference to FIGS. 5A-C, following the post-float mode, the supercapacitor module 504 is fully recharged. In this way, the charge in the supercapacitor module 504 is immediately available to supplement the current flow from the external power source 602 during the first time period of the pulse charging.

In the second time period, the controller 102 controls the power system 500 such that the first power flow from the external power source 602 does not charge the battery module 506. At the same time, the controller 102 also controls the first power flow from the external power source 602 to charge the supercapacitor module 504 in the second time period. This is brought about by the controller 102 configuring the power system 500 to be in the second state. In this way, the charge level of the supercapacitor module 504 is topped up in the second time period to be able to charge the battery module 506 in the first time period.

In this way, the substantially constant current input from the external power source 602 charges the battery module 506 in the first time period and the supercapacitor module 504 in the second time period.

In more detail, the first switching means 522 is controlled by the controller 102 to switch between charging the battery module 506 in the first time period and not charging the battery module 506 in the second time period. That is, in the first state, the first switching means 522 is closed to allow the first power flow to the battery module 506. In the second state, the first switching means 522 is open to stop the first power flow to the battery module 506.

The voltage converter 530 is configured to step-down the voltage of the second power flow from supercapacitor module 504 to battery module 506 in first time period (i.e. in the first state). The voltage converter 530 is a bi-directional voltage converter, and is controlled by the controller 102 to prevent the first power flow, from the external power source 602, flowing to the supercapacitor module 504 during the first time period (i.e. in the first state). The voltage converter 530 also controls the power flow to the supercapacitor module 504 to prevent overcharging should the supercapacitor module 504 be fully charged before the end of the second time period.

The controller 102 controls the first switching means 522 to open and close at the pulse rate of the pulse charging. Likewise, the controller 102 controls the voltage converter 530 to switch between allowing and preventing the power flow from the external power source 602 to the supercapacitor module 504, and from the supercapacitor module 504 to the battery module 506, at the pulse rate of the pulse charging. This provides power management control to switch the power system 500 between the first state in the first time period and the second state in the second time period. That is, the controller 102 controls the first switching means 522 and the voltage converter 530 to switch the power system 500 between the first state and the second state to manage the pulse charging regime.

In an example, the controller 102 is configured to automatically detect when the external power source 602 is connected to the node 604. Upon detection of the external power source 602 being connected to the node 604, the controller 102 initiates the pulse charging regime.

Figure 6C:
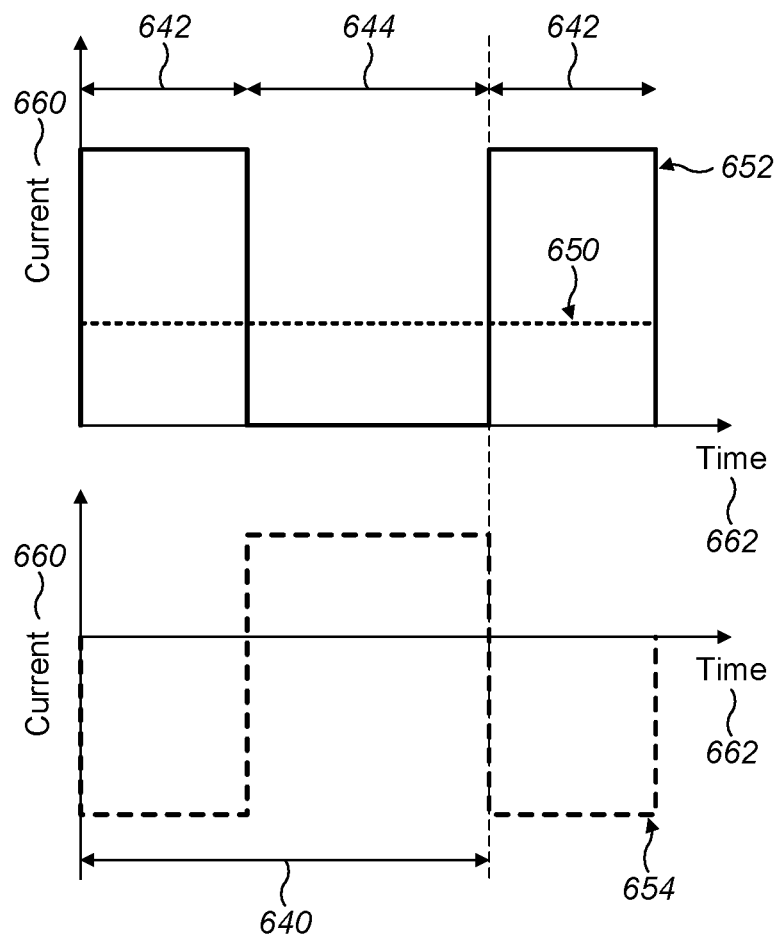
FIG. 6C shows plots of current against time for the current flow from the external power source, the current flow into the battery module and the current flow into and out of the supercapacitor module, for a pulse charging protocol of the power system of FIG. 6A.

FIG. 6C shows an illustrative dual plot of current 660 against time 662 for the substantially constant current input from the external power source 650 (dotted line) and the current flow 652 (solid line) into the battery module 506 (upper panel), and the current flow 654 (dashed line) into and out of the supercapacitor module 504 (lower panel). The plot also shows how these current flows are implemented in a pulse cycle 640 comprising the first time period 642 and the second time period 644, followed the first time period 642 of the next pulse cycle.

As is presented, the current flow 650 from the external source is substantially constant.

During the first time period 642, the controller 102 controls the power system 500 to be in the first state. The current flow 650 from the external source is directed to the battery module 506 and combined with the current flow 564 from the supercapacitor module 504 to the battery module 506. As such, the amplitude of the current flow 652 into the battery module 506 is greater than the substantially constant current flow 650 into the power system 500 from the external source.

During the second time period 644, the controller 102 controls the power system 500 to be in the second state. The current flow 650 from the external source is directed to the supercapacitor module 504 and (at least partially) compensates for the current discharged from the supercapacitor module 504 into the battery module 506 in the first time period 642.

In this way, in the first time period 642 the current flow 650 from the external source into the battery module 506 is boosted by the current flow from the supercapacitor module 504 into the battery module 506. In the second time period 644, the current flow from the external source into the supercapacitor module 504 recharges the supercapacitor module 504.

The substantially constant current flow 650 from the external source is therefore switched such that it is used to charge the battery in the first time period 642 and the supercapacitor module 504 in the second time period 644.

In traditional pulse charging the battery is charged in the first time period and the current flow from the external source is disabled in the second time period. That is, in traditional pulse charging, there is no utilisation of the current flow from the external source in the second time period. The implementation described with reference to FIGS. 6A and 6B is advantageous because the current flow from the external source is utilised in the second time period to charge the supercapacitor module 504. This then boosts the charging of the battery module 506 in the first time period to more rapidly charge the battery module 506 for a given input current level from the external power source 602 by making better use of the power.

By boosting of the current flow from the external power source 602 into the battery module 506 using the supercapacitor module 504, a lower power external power source 602 can be used for pulse charging. For example, a high power wall adapter is not required to achieve fast pulse charging, and instead a less powerful supply such as a lower power USB appliance or port in another device can be used. This provides advantages including reductions in cost, reductions in losses and improvements in efficiency, greater flexibility in device design and reductions in device size.

As such, the configuration of the power system 500 described with reference to FIGS. 5A and 6A is advantageous for multiple reasons: firstly it brings about the incremental charging during an aerosolisation session, thereby increasing the time for which supercapacitor module 504 is able to power the heater, and secondly it allows for the supercapacitor module 504 to boost the external power supply for fast pulse charging.

In the preceding description, the controller 102 can store instructions for operating the aerosol generation device, and execute them as required. The skilled person will readily understand that the controller 102 can be configured to execute any of the aforementioned features in combination with one another as appropriate. The processing steps described herein carried out by the controller 102 may be stored in a non-transitory computer-readable medium, or storage, associated with the controller 102. A computer-readable medium can include non-volatile media and volatile media. Volatile media can include semiconductor memories and dynamic memories, amongst others. Non-volatile media can include optical disks and magnetic disks, amongst others.

It will be readily understood to the skilled person that the preceding embodiments in the foregoing description are not limiting; features of each embodiment may be incorporated into the other embodiments as appropriate.

The invention claimed is:

1. An aerosol generation device, the aerosol generation device comprising:
  a power system comprising a supercapacitor module and a battery module, the power system connectable to an external power source; and
  a controller, wherein the controller is configured to control a pulse-charging regime of the power system by:
    controlling a first power flow from the external power source to the power system, wherein controlling the first power flow from the external power source to the power system comprises cyclically switching the first power flow between charging the battery module in a first time period and not charging the battery module in a second time period in a pulse-charging manner; and
    controlling a second power flow between the supercapacitor module and battery module, wherein controlling the second power flow between the supercapacitor module and the battery module comprises charging the battery module from the supercapacitor module in the first time period.

2. The aerosol generation device of claim 1, wherein controlling the first power flow further comprises charging the supercapacitor module from the external power source during the second time period.

3. The aerosol generation device of claim 1, wherein controlling the first power flow further comprises not charging the supercapacitor module from the external power source during the first time period.

4. The aerosol generation device of claim 1, wherein controlling the second power flow further comprises not charging the battery module from the supercapacitor module in the second time period.

5. The aerosol generation device of claim 1, wherein the first power flow comprises a substantially constant current flow into the power system.

6. The aerosol generation device of claim 1, wherein the battery module comprises at least one battery and/or at least one removable power bank.

7. The aerosol generation device of claim 1, wherein the supercapacitor module contains two or more supercapacitors connected in series.

8. The aerosol generation device of claim 1, wherein the power system comprises the supercapacitor module connected in parallel with the battery module, with a voltage converter connected between the supercapacitor module and the battery module.

9. The aerosol generation device of claim 8, wherein the voltage converter is configured to step-down the voltage of the second power flow from supercapacitor module to battery module in the first time period.

10. The aerosol generation device of claim 1, wherein the power system further comprises a first switching means connected between the battery module and the supercapacitor module, wherein the first switching means is controlled by the controller to switch between charging the battery module in a first time period and not charging the battery module in a second time period.

11. A system comprising the aerosol generation device of claim 1, and the external power source.

12. The system of claim 11, wherein the external power source is a power adapter connectable to a mains supply and/or a power bank, a docking station configured to receive the aerosol generation device, or a portable charging case configured to receive the aerosol generation device.

13. A method of controlling a pulse-charging regime of a power system of an aerosol generation device, the power system comprising a supercapacitor module and a battery module and connectable to an external power source and the method comprising:
controlling a first power flow from the external power source to the power system, wherein controlling the first power flow from the external power source to the power system comprises cyclically switching the first power flow between charging the battery module in a first time period and not charging the battery module in a second time period in a pulse-charging manner; and
controlling a second power flow between the supercapacitor module and battery module, wherein controlling the second power flow between the supercapacitor module and the battery module comprises charging the battery module from the supercapacitor module in the first time period.

14. A non-transitory computer-readable medium storing instructions that when executed by one or more processors of a controller configured for operation with an aerosol generation device power system comprising a supercapacitor module and a battery module, connectable to an external power source, cause the one or more processors to control a pulse-charging regime of a power system by:
controlling a first power flow from the external power source to the power system, wherein controlling the first power flow from the external power source to the power system comprises cyclically switching the first power flow between charging the battery module in a first time period and not charging the battery module in a second time period in a pulse-charging manner; and
controlling a second power flow between the supercapacitor module and battery module, wherein controlling the second power flow between the supercapacitor module and the battery module comprises charging the battery module from the supercapacitor module in the first time period.

\* \* \* \* \*